United States Patent [19]
Gloyer

[11] Patent Number: 4,764,428
[45] Date of Patent: Aug. 16, 1988

[54] FREE-FLOWING, NON-DUSTING ANTISTATIC AGENT COMPOSITION PELLETS AND METHOD OF FORMING SAME

[75] Inventor: Stewart E. Gloyer, Germantown, Tenn.

[73] Assignees: Witco Chemical Corporation, New York, N.Y.; Witco Chemical Corporation, New York, N.Y.

[21] Appl. No.: 56,391

[22] Filed: May 29, 1987

[51] Int. Cl.$^4$ .................... B32B 5/16; C09K 3/00; L08J 5/29; C08K 5/04
[52] U.S. Cl. .................................. 428/402; 252/8.8; 524/243; 524/394; 524/910; 524/911; 524/912; 524/913
[58] Field of Search ............... 524/243, 394, 910, 911, 524/912, 913; 252/8.8, 182; 106/2; 428/402

[56] References Cited

U.S. PATENT DOCUMENTS

| | | | |
|---|---|---|---|
| 4,210,556 | 7/1980 | Castro et al. | 525/6 |
| 4,314,040 | 2/1982 | Castro et al. | 524/911 |
| 4,559,380 | 12/1985 | Kasuga | 524/910 |
| 4,917,999 | 11/1983 | Duffy | 524/612 |

Primary Examiner—Joseph L. Schofer
Assistant Examiner—Peter D. Mulcahy
Attorney, Agent, or Firm—Lockwood, Alex, Fitzgibbon & Cummings

[57] ABSTRACT

A pelletizing antistatic agent composition and a method of forming same are provided. The composition includes a predominantly $C_{18}$ alkyl ethoxylated primary amine component and a metal stearate type of component, preferably together with an antioxidant. The resulting composition is formed into a plurality of pellets and functions as an antistatic agent in plastics of various types, such as food packaging polyolefin materials.

16 Claims, No Drawings

FREE-FLOWING, NON-DUSTING ANTISTATIC AGENT COMPOSITION PELLETS AND METHOD OF FORMING SAME

BACKGROUND AND DESCRIPTION OF THE INVENTION

Considerable efforts have been made to provide an antistatic agent (commonly referred to as an "antistat") composition in a form which can be readily combined with various resins for extruding, molding or otherwise shaping plastic products which do not collect electrostatic charges on their surfaces. The present invention generally relates to an improved antistatic agent composition that is adapted to be formed into a free-flowing, non-dusting pellet which, in turn, may be added to known polymers to minimize, if not prevent, the marked tendency of polymers, such as thermoplastic polymers, to accumulate static charges. Such accumulation of static charges can result in the adherence of dust or other matter to the plastic products. Antistatic agents can be additives which migrate to the surface of a plastic, fiber or the like to modify its electrical properties.

Broadly, the antistatic agent pellet composition of the present invention includes an ethoxylated alkyl primary amine combined with a metal salt of a fatty acid such as a stearate or palmitate. The invention extends to a method of forming pellets from this composition. The composition can also advantageously include an antioxidant component which is included within the pelletized product. Ethoxylated amines have been used as antistatic agents in plastics. It has been common to make such amines from coconut or tallow-based products, resulting in liquid or paste forms of amines which are difficult to incorporate into conventional plastic material. A solid antistatic agent has been recognized as a preferred product, and U.S. Pat. No. 4,417,999, is directed to the forming of a solid antistatic agent using alkyl ethoxylated primary amines, the antistatic agent of this patent being in the form of a dried powder.

As reported in this patent, an alkyl ethoxylated primary amine that is predominantly 18 carbons in chain length, having a melting point of 50°-52° C., can be sprayed into a powder. However, once the powder is packaged or otherwise stored, it has been observed that it begins to lump and can continue to do so until its powdery condition is substantially lost. In an attempt to overcome this problem, it was found that if fumed silica or silica gel was mixed with the amine powder, lumping was prevented. This discovery constituted a substantial advance in the art because a non-lumping, free-flowing powder can be readily combined with polymeric materials to reduce, if not eliminate, the formation of electrostatic charges on the surfaces of articles formed from such polymeric materials.

The aforementioned antistatic powder does have its drawbacks. A powder produces dust on handling which can be undesirable because of potential health hazards as well as possible potential explosion hazards that can be attributed to dust producing materials. Also, somewhat closely controlled temperature conditions are required in storing and transporting powder products. A powder can be difficult to feed into or move through a material handling system, such as that utilizing screw augers. A powder can also be lost through small cracks or openings in material handling systems of the type that can be used in processing polymers into shaped forms such as sheets, films, filaments and molded plastic items.

By the present invention, an antistatic agent pellet composition is provided which combines an ethoxylated alkyl primary amine with a metal salt of a fatty acid such as a metal stearate, a metal palmitate or blends thereof. It has been found that the resulting composition may be readily pelletized thereby eliminating the disadvantages attendant to utilization of a powdered antistatic agent. The resulting pellets are free-flowing and non-dusting, thus eliminating any of the material storage, transporting and handling problems as well as the potential or perceived safety and health hazards mentioned above. The pellets may vary in size but are of sufficient size to prevent losses of antistatic agent through cracks or openings in a material handling system. The pellet composition is readily compatible with polymeric materials for addition thereto, such as by re-pelletizing therewith. In this manner, the antistatic agent is readily incorporated into an ultimately extruded, molded or otherwise formed plastic product that is substantially, if not completely, free of the propensity to collect electrostatic charges. In a preferred embodiment, a suitable antioxidant will be included in the composition, such an antioxidant being preferably in the form of a hindered phenol. The metal salt of fatty acid component is preferably zinc stearate or calcium stearate, although such stearate used in the composition in fact may be a blend of $C_{18}$ stearate and $C_{16}$ palmitate.

It is accordingly a general object of the present invention to provide an improved antistatic agent pellet composition and method of forming same.

Another object of the present invention is to provide an improved alkyl ethoxylated primary amine pellet composition including a metal stearate or the like and preferably, although not essentially, an antioxidant.

Another object of this invention is to provide a method for forming the alkyl ethoxylated primary amine pellets, wherein the feed rate of the ingredients of the pellet composition into the pelletizing mill is on the order of approximately 1000 to 1200 pounds per hour.

Another object of the invention is to provide an essentiall $C_{18}$ alkyl ethoxylated primary amine antistatic agent pellet which is free-flowing, non-dusting, non-sticky, and is not susceptible to lumping, and which is adapted for addition to polymeric material for the extrusion, molding or other formation of plastic articles.

These and other objects, features and advantages of the present invention will be clearly understood through a consideration of the following detailed description.

DESCRIPTION OF THE PARTICULAR EMBODIMENTS

The antistatic agent pellet compositions of the present invention include an ethoxylated alkyl primary amine component that is solid at room temperature. The amines intended for use herein are predominantly $C_{18}$ alkyl ethoxylated primary amines, although they may contain as much as about 50 percent of $C_{16}$ alkyl groups. The antistatic agent pellets of the present invention are made from a composition that also includes a metal salt of a fatty acid of about 14 to 18 carbon atoms. Preferably, zinc stearate is utilized but other stearates and blends may be used, such as calcium stearate and a blend of metal salt of $C_{18}$ stearate and metal salt of $C_{16}$ palmitate.

Preferably, a suitable antioxidant, typically of the phenolic type, will be incorporated into the pellet-forming composition. Hindered phenol antioxidants have been found to be especially advantageous. Examples of such suitable antioxidants are octadecyl 3-(3,5-di-tertbutyl-4-hydroxyphenyl) propionate (known commercially as Irganox ®1076 available from Ciba-Geigy) and tetra-bis (methylene-3-3'-5'-di-tertbutyl-4'-hydroxy phenyl propionate) methane (known commercially as Irganox ® 1010 also available from Ciba-Geigy).

The amine components of the present antistatic agent composition, as well as the preferred antioxidant components, are rather waxy in their respective powder states, and they are accordingly difficult to pelletize. Although each can be formed into a pellet, each tends to form lumps in its package, this problem being more evident with the antioxidant. The preferred fatty acid metal salt components in powder form cannot be pelletized by themselves. This combination of properties, each alone providing an unacceptable pellet, has been found, according to the present invention, to result in a pellet exhibiting the type of free-flowing properties that have been found to be advantageous according to the present invention. A component such as fused silica or silica gel should not be included because it will thwart the formation of a mixture suitable for pelletizing.

The resulting antistatic pellets of the present invention are particularly well suited for use with linear low density polyethylene powder. However, the antistatic agent composition of the present invention is useful with a broad range of plastic materials, including polymers and copolymers made from ethylenically unsaturated monomers (for example vinyl chloride, vinylidene chloride, styrene, and the like) and polyolefins (for example polyethylene, polypropylene, polybutylene, and the like).

Any suitable type of pelletizing mill may be used in preparing the pellet composition of the present invention. The type of mill used in carrying out the examples, as set forth hereinafter, includes a rotating die in the form of a ring provided with die holes extending therethrough, the radial thickness of the ring establishing the length of the die holes. Within the ring a plurality of free-turning rollers are provided along with a powder feed chute by means of which the composition in powder form is fed into the interior of the rotating die and is distributed against the inner surface of the die by the rollers, ultimately being forced through the die holes. An adjustable knife is mounted externally of the rotating die. The composition in powder form is fed by a screw auger into the mouth of the feed chute. The powder falls by gravity to the interior bottom of the rotating die and is squeezed between the die and the interior rollers. In this manner the powder is compacted into the holes of the die and is forced through the holes to the outside of the die where the compacted powder is cut by the knife into pellets of desired length. The diameter of the pellet is determined by the diameter of the die hole, and the length of the pellet is determined by the distance the knife is placed from the die surface.

One parameter connected with using these types of conventional pelletizing mills is the rate at which the powder of the composition to be pelletized is fed into the mill. As mentioned hereinabove, the individual components of the antistatic agent composition do not possess superior pelletizing attributes. The combination of properties of these individual components tends to clog conventional pelletizing mills, and it has been found that it is desirable and preferred to control the feed rate of the powder composition into the pelletizing mill. Accordingly, it is preferred that an auger screw feed mechanism of a generally conventional design be used to control the rate of feed of powder to the mill. Preferably, the rate of feed should be lower than the conventional rate of feed for a given pelletizing mill, for example, on the order of 1000 to 1200 pounds per hour. At what might be considered to be a conventional rate of feed of 1500 pounds per hour for the type of pelletizing mill of the present examples, the aforementioned physical characteristics of the powdered components of the present antistatic agent composition can cause the composition to back up inside the die ring. When this occurs, the material tends to compact into big clumps within the die ring and will not readily extrude through the die.

The size of the pellets may vary. Considerations that enter into size selection include the equipment to be utilized by the user of the pellets. For example, when the user is a polymer supplier who will combine the pellets of the present invention with a selected resin or polymer in order to form a combined pellet which in turn is sold to plastic product fabricators, the pellet size most desirable for such use within the polymer supplier's pellet forming equipment should be selected.

Acceptable pellets have been made in a wide range of sizes, such as diameters between about 1.6 mm and 6.5 mm (1/16 to ¼ inch) and lengths between about 1.6 mm and 26 mm (1/16 to 1 inch). Such dimensions are determined primarily by die and knife configurations. Pellets according to the invention have been made, for example, with a diameter of 2.4 mm (3/32 inch) and a length ranging between 1.6 mm (1/16 inch) and 13 mm (½ inch), as well as with a diameter of 4 mm (5/32 inch) and a length ranging between 1.6 mm (1/16 inch) and 13 mm (½ inch). Pellets have also been made with a diameter of 5 mm (1/5 inch) and a variety of similar lengths. A typical pellet size utilizing the composition of the present invention is on the order of 4 mm in diameter and 9 mm in length.

The important factors involving pellet size are that the pellets remain free-flowing, non-sticky and non-dusting and are readily utilized by the customer's polymer pelletizing equipment. Pellets according to the present invention avoid the disadvantages of powders as discussed herein. They also provide for improved feeding by customers when making or using plastic or polymer material pellets. Additionally, it has been found that the use of the pellets of the present invention decreases the frequency with which the pelletizing equipment of these customers needs to be cleaned.

EXAMPLES 1 THROUGH 12

Following the procedures set forth above, compositions were tested in California Mill pellet mills for formation of acceptable pellets. The results are summarized in the Table, all percents being expressed as weight percent of the component based on the total weight of the formulation.

TABLE

| Example No. | Percent Ethoxylated Stearyl Amine | Percent Zinc Stearate | Percent Irganox ® 1076 | Percent Irganox ® 1010 | Percent Calcium Stearate | Percent Silica Gel | Percent Linear Low Density Polyethylene Powder | Acceptable Pellet Formation |
| --- | --- | --- | --- | --- | --- | --- | --- | --- |
| 1.  | 100.0 | —    | —    | —    | —    | —   | —    | No  |
| 2.  | —    | 100.0 | —    | —    | —    | —   | —    | No  |
| 3.  | —    | —    | 100.0 | —    | —    | —   | —    | No  |
| 4.  | —    | 80.0 | 20.0 | —    | —    | —   | —    | No  |
| 5.  | 50.0 | 50.0 | —    | —    | —    | —   | —    | Yes |
| 6.  | 38.5 | 38.5 | 23.1 | —    | —    | —   | —    | Yes |
| 7.  | 50.0 | —    | —    | —    | 50.0 | —   | —    | Yes |
| 8.  | 7.7  | 87.7 | 4.6  | —    | —    | —   | —    | No  |
| 9.  | 38.5 | 38.5 | —    | 23.1 | —    | —   | —    | Yes |
| 10. | 30.8 | 30.8 | 18.5 | —    | —    | —   | 20.0 | No  |
| 11. | 37.5 | 22.5 | 37.5 | —    | —    | 2.5 | —    | No  |
| 12. | 55.6 | 27.8 | 16.7 | —    | —    | —   | —    | Yes |

Example 1 solely contains the predominantly $C_{18}$ alkyl ethoxylated primary amines, and this powder will not pelletize by itself. In its powder form large lumps will form in the package ultimately interfering with its use. Example 2 establishes that zinc stearate by itself cannot be molded into a pellet. Example 3, involving the sole use of the antioxidant Irganox ® 1076 in powder form, resulted in unacceptable pellet formation. Even though this antioxidant, as well as the companion antioxidant Irganox ® 1010, can be molded into a pellet, the pellets formed will lump in a package during storage and handling. Therefore, none of the principal ingredients of the composition of the present invention are capable individually of forming an acceptable pellet for the intended purposes. Even the combination of zinc stearate and Irganox ® 1076 will not function properly as set forth in Example 4.

Example 5 establishes that an acceptable pellet can be formed utilizing a 50-50 mixture of the amine and of the zinc stearate. Example 6 establishes a particularly successful pelletizing composition utilizing a mixture of equal parts of the amine and of the zinc stearate combined with the antioxidant Irganox ® 1076, the weight ratio being approximately 5:5:3. Example 7 illustrates the successful use of calcium stearate in an equal mixture with the amine. When excessive amounts of the stearate metal salt were included, unsuccessful pelletization was observed, as shown by Example 8. Example 9 illustrates successful utilization of the antioxidant Irganox ® 1010 at a ratio consistent with Example 6. Example 10 illustrates unsuccessful pelletization when attempting to incorporate powdered polymer directly into the antistatic agent compositions by the use of a California Mill type of pellet mill.

Example 11 illustrates that the presence of silica gel interferes with the formation of acceptable pellets even though the basic ingredients, including the antioxidants, of the present invention are all included. Consistent with U.S. Pat. No. 4,417,999, silica gel is effective in preventing clumping in the powder form of $C_{18}$ alkyl ethoxylated primary amine, and it can be important to include silica if it is desired to establish a free-flowing powder. However, as illustrated by Example 11, in forming the pellets of the present invention, silica gel will inhibit the formation of pellets that are useful according to the present invention. Advantageously, this further illustrates that the present invention eliminates the use of an ingredient, namely silica, which is believed not to enhance the functionality of antistatic agents according to the invention. Also, silica can be the source of a potential hazing problem that can be especially troublesome for high clarity films.

Example 12 resulted in the acceptable formation of pellets at a weight ratio of 10:5:3 for amine:stearate:antioxidant. The pellets thus formed were softer than those having lower levels of amine and did not exhibit the same degree of hardness that would resist the development of tackiness when the pellets would be stored in a warm warehouse.

As can be seen, the formation of acceptable pellets requires the amine and the stearate but not necessarily the antioxidant. However, the antioxidant is preferably included, and it does not interfere with the formation of acceptable pellets. When all three components are present, an especially advantageous ratio of the three components is approximately 5 to 5 to 3, with the antioxidant constituting about 3/13 of the composition. Each component of this ratio can be plus or minus at least about 5 weight percent, or more. The pellets formed are free-flowing, non-dusting and non-sticky even after storage at elevated temperatures. These pellets are sized to be adequate to prevent any loss thereof through cracks or the like in pelletizing equipment used by a customer to combine the subject pellets with a suitable polymer such as a linear low density polyethylene, usually by dry blending or tumbling the polymer with the subject pellets, melting the blend, and forming antistatic polymer pellets therefrom. The pellets of the present invention may be stored indefinitely in packaged form, and they may be subjected to the usual handling during shipping and storage without any resulting detrimental effects.

It will understood that the embodiments of the present invention which have been described are illustrative of some of the applications of the principles of the present invention. Numerous modifications may be made by those skilled in the art without departing from the true spirit and scope of the invention.

I claim:

1. An antistatic agent composition in pellet form for addition to polymeric materials, the antistatic agent pellet composition consisting essentially of an ethoxylated alkyl primary amine component and a metal salt of a fatty acid component combined together into a plurality of pellets containing said components, wherein said amine component and said fatty acid metal salt component are present in the pellets at a weight ratio of between 5 and 10 to 5, respectively, plus or minus at least approximately 5 weight percent variation of each such component.

2. The antistatic agent composition according to claim 1, wherein an antioxidant component is further included within the pellets.

3. The antistatic agent composition according to claim 1, wherein the pellets have a diameter of between approximately 1.6 mm and 6.5 mm and a length of between approximately 1.6 mm and 26 mm.

4. The antistatic agent composition according to claim 1, wherein said amine component includes an alkyl chain of 18 carbon atoms together with up to about 50 weight percent amine component having an alkyl chain of 16 carbon atoms.

5. The antistatic agent composition according to claim 1, wherein said metal salt of a fatty acid is selected from the group consisting of zinc stearate, calcium stearate and blends thereof.

6. The antistatic agent composition according to claim 1, wherein said metal salt of fatty acid is a blend of fatty acid salts having a chain length of between 16 and 18 carbon atoms.

7. The antistatic agent composition according to claim 2, wherein said amine component includes an alkyl chain of 18 carbon atoms together with up to about 50 weight percent amine component having an alkyl chain of 16 carbon atoms.

8. The antistatic agent composition according to claim 2, wherein said metal salt of a fatty acid is selected from the group consisting of zinc stearate, calcium stearate and blends thereof.

9. The antistatic agent composition according to claim 2, wherein said metal salt of fatty acid is a blend of fatty acid salts having a chain length of between 16 and 18 carbon atoms.

10. The antistatic agent composition according to claim 2, wherein said amine component, fatty acid metal salt component and antioxidant component are present in the pellets at a weight ratio of approximately 5 to 5 to 3, respectively, plus or minus at least approximately 5 weight percent variation of each component.

11. The antistatic agent composition according to claim 7, wherein said metal salt of a fatty acid is selected from the group consisting of zinc stearate, calcium stearate and blends thereof.

12. The antistatic agent composition according to claim 2, wherein said fatty acid metal salt component is zinc stearate, and the ratio of amine component, zinc stearate component and antioxidant component are present in the pellets at a weight ratio of 5 to 5 to 3, respectively, plus or minus at least approximately 5 weight percent variation of each component.

13. The antistatic agent composition according to claim 2, wherein said amine component, fatty acid metal salt component and antioxidant component are present in the pellets at a weight ratio of between 5 and 10 to 5 to 3, respectively, plus or minus at least approximately 5 weight percent variation of each component.

14. The antistatic agent composition according to claim 10, wherein said metal salt of a fatty acid is selected from the group consisting of zinc stearate, calcium stearate and blends thereof.

15. The antistatic agent composition according to claim 14, wherein the pellets have a diameter of between approximately 1.6 mm and 6.5 mm and a length of between approximately 1.6 mm and 26 mm.

16. The antistatic agent composition according to claim 2, wherein said antioxidant component is a hindered phenol antioxidant.

* * * * *

UNITED STATES PATENT AND TRADEMARK OFFICE
CERTIFICATE OF CORRECTION

PATENT NO.  : 4,764,428
DATED       : August 16, 1988
INVENTOR(S) : Stewart E. Gloyer It is certified that error appears in the above—identified patent and that said Letters Patent is hereby corrected as shown below:

Title page:

Under "Assignees:", second line, delete "; Witco Chemical Corporation, New York, N.Y."

Col. 2, lines 43-44, "essentiall" should read --essentially--.

Col. 6, line 51, insert --be-- after "will".

Signed and Sealed this

Twenty-second Day of August, 1989

Attest:

DONALD J. QUIGG

Attesting Officer

Commissioner of Patents and Trademarks